United States Patent
Diaz et al.

(10) Patent No.: US 8,284,995 B2
(45) Date of Patent: Oct. 9, 2012

(54) METHOD FOR UPDATING A GEOGRAPHIC DATABASE FOR AN IN-VEHICLE NAVIGATION SYSTEM

(75) Inventors: Luis Sampedro Diaz, Mountain View, CA (US); Daniel Rosario, Santa Cruz, CA (US); Daniel Held, Palo Alto, CA (US)

(73) Assignee: Volkswagen of America, Inc., Auburn Hills, MI (US)

( * ) Notice: Subject to any disclaimer, the term of this patent is extended or adjusted under 35 U.S.C. 154(b) by 1096 days.

(21) Appl. No.: 12/174,003

(22) Filed: Jul. 16, 2008
(Under 37 CFR 1.47)

(65) Prior Publication Data

US 2010/0014712 A1    Jan. 21, 2010

(51) Int. Cl.
*G06K 9/00* (2006.01)
(52) U.S. Cl. .......... 382/104; 701/208; 701/200
(58) Field of Classification Search .......... 382/103, 382/104; 701/208
See application file for complete search history.

(56) References Cited

U.S. PATENT DOCUMENTS

| | | | |
|---|---|---|---|
| 5,633,946 A | 5/1997 | Lachinski et al. | |
| 5,948,042 A | 9/1999 | Heimann et al. | |
| 6,873,998 B1 | 3/2005 | Dorum et al. | |
| 7,363,151 B2* | 4/2008 | Nomura et al. | 701/445 |
| 2006/0155464 A1 | 7/2006 | Smartt | |

FOREIGN PATENT DOCUMENTS

| | | |
|---|---|---|
| DE | 19525291 C1 | 12/1996 |
| DE | 10117237 A1 | 10/2001 |
| EP | 0107185 B1 | 4/1989 |
| JP | 2007004655 A | 1/2007 |
| KR | 100787747 B1 | 12/2007 |
| WO | 2006101012 A1 | 9/2006 |

OTHER PUBLICATIONS

Search Report for German Patent Application No. 10 2009 018 073.7, dated Feb. 9, 2010.

* cited by examiner

*Primary Examiner* — Claire X Wang
(74) *Attorney, Agent, or Firm* — Manfred Beck, P.A.

(57) ABSTRACT

A method for updating a geographic database containing image data and road vector data to be used in vehicle navigation systems includes determining whether a vehicle is in an on-road position based on information provided by the vehicle navigation system. A geographically coded image is generated with a vehicle-mounted camera if the vehicle is not in an on-road position according to the information provided by the vehicle navigation system. The geographically coded image generated by the vehicle-mounted camera is analyzed in order to determine whether the geographic database requires updating.

23 Claims, 5 Drawing Sheets

METHOD FOR UPDATING A GEOGRAPHIC DATABASE FOR AN IN-VEHICLE NAVIGATION SYSTEM

BACKGROUND OF THE INVENTION

Field of the Invention

The invention relates in general to a method for updating a geographic database. More specifically, the invention relates to a method for updating a geographic database that includes image data such as satellite imagery or aerial imagery and road map vector data for use in maps in general, and for use in in-vehicle navigation systems in particular.

Conventional in-vehicle navigation systems typically access a geographic database contained, for example, on a DVD (Digital Versatile Disc) or some other local data storage medium. Geographic databases include a geographic representation of the roads in the form of a road map vector database. Geographic databases may further include speed limits along the roads, turn restrictions, road names, locations of stop lights, and so forth. Geographic databases may additionally include points of interest such as hotels, restaurants, gas stations, parks, and airports.

The information contained in these geographic databases is used, for example, to generate maps or calculate a route. However, when changes occur, for example, when new roads are constructed, when businesses change their location or name, when turn restrictions are added or modified, then the information contained in these geographic databases becomes obsolete. Thus, these geographic databases must be constantly updated and distributed.

With the help of an image processing procedure, satellite and/or aerial imagery can be used to extract geographic data, for example, geographic coordinates of roads. Moreover, the satellite and/or aerial imagery can also be used to generate overhead maps or even three dimensional photorealistic maps that can be combined with the geographic database in order to overlay roads, road names, points of interest, routes and other information. As a consequence, the satellite and/or aerial imagery databases must also be continuously updated.

In order to collect information for updating a geographic database, a number of methods have been used. Information for the geographic database can be collected by people who are hired to physically travel to certain areas and to record geographic characteristics. A disadvantage of collecting geographic information with people who physically drive on all roads in an assigned geographic area in order to collect information is that it is time-consuming and expensive. Another disadvantage of collecting geographic information with people who physically travel to certain areas is that the collection of information must be performed repeatedly at short intervals in order to keep the geographic database up to date. In some cases, for example in areas that are being built up, it may not be possible to update the geographic database in a timely manner.

Another, more complex approach for updating a geographic database is described in U.S. Pat. No. 6,873,998 B1, which discloses a reporting program for updating a master copy of a geographic database. In accordance with the method of U.S. Pat. No. 6,873,998 B1, reports are obtained that relate to data contained in the geographic database. Satellite images of the geographic locations represented by the data in the reports are obtained. The satellite images are analyzed in order to confirm whether changes to the geographic database are necessary based on the reports. After confirming the need to make changes, the geographic database is updated. A disadvantage of this method is that it relies on the end user to report changes. End users may lack the required experience, motivation or time to detect database errors, to correctly document the database errors and to communicate the database errors to the database developer. As a result, a method for updating a geographic database as described in U.S. Pat. No. 6,873,998 B1 may not be reliable. Another disadvantage of this method is that generally archived satellite imagery is used to confirm the end user reports regarding database changes. Archived satellite imagery for confirming an end user report may be out date and thus a satellite image may have to be taken before the end user report can be confirmed. Another disadvantage of the method described in U.S. Pat. No. 6,873,998 B1 is that the satellite imagery that is used for confirming an end user report may have a resolution that is insufficient to confirm a geographic characteristic. In this case, a person would have to travel to the location in order to confirm whether a database update is required.

A further approach for updating a geographic database is based on the concept of monitoring traffic flow patterns and reporting deviations from normal traffic flow patterns in order to update road vectors. The traffic flow patterns are monitored by recording data points that are collected by driving on the roads in the road network with vehicles equipped with a navigation system. If a vehicle does not follow the nearest road vector stored in the memory of a navigation system, then this is considered an anomaly and the vehicle may be labeled as driving "off-road." If enough vehicles report the same anomaly, then one can statistically infer that perhaps the road vector itself has changed. The basic concept of such a system is for example disclosed in U.S. Patent Application Publication No. 2006/0155464 A1, which describes a method for generating, deriving, and enhancing drivable road databases.

In accordance with U.S. Patent Application Publication No. 2006/0155464 A1, a baseline road in a road network is defined. Position and/or trajectory data are collected by vehicles traveling the baseline road and are compared to a representation of the baseline road in an existing database in order to update the existing database. A disadvantage of this method is that it does not account for cases where many vehicles experience the same technical error, such as a GPS (Global Positioning System) drift. A GPS drift affecting a large number of GPS systems is not unlikely given the fact that there is only a small number of automotive GPS chipset suppliers. A technical error in the chipset of only a single chipset supplier may thus affect a large number of GPS systems. As a result, the data points collected by affected GPS systems would be incorrect and the existing database could be updated based on incorrect data. A further disadvantage of the method is that there is a lack of efficiency because it tends to isolate the process of reporting an anomaly from the acquirement and analysis of the data and, eventually, the update of the database.

SUMMARY OF THE INVENTION

It is accordingly an object of the invention to provide a method for updating a geographic database which overcomes the above-mentioned disadvantages of the heretofore-known methods of this general type and which is more efficient than conventional methods of updating a geographic database.

With the foregoing and other objects in view there is provided, in accordance with the invention, a method for updating a database, which includes the steps of:

determining whether a vehicle is in an on-road position based on information provided by an in-vehicle navigation system (100);

generating a geographically coded image by using a vehicle-mounted camera, if the vehicle is not in an on-road position according to the information provided by the in-vehicle navigation system (102); and analyzing the geographically coded image generated by the vehicle-mounted camera in order to determine whether a geographic database requires updating.

An advantage of the above-defined method according to the invention is that an update of the road map vector database is made more efficient because the method steps are automatically performed and do not require the end-user to recognize a database error and report the database error via the telephone or the Internet. As a result, error reports originating from the vehicles of end users can be sent instantly and thus updates of the geographic database can be performed faster than when using conventional methods. Another advantage of the method according to the invention is that imagery and information about new roads can be acquired in an efficient and cost-effective manner, because the method is suitable to be performed by hardware that is available in vehicles of end users.

According to another mode of the method of the invention, the step of analyzing the geographically coded image generated by the vehicle-mounted camera includes comparing the geographically coded image to stored photorealistic image data (104).

Another mode of the method according to the invention includes analyzing the geographically coded image generated by the vehicle-mounted camera in order to detect road characteristics in the geographically coded image (106), if the geographically coded image matches geographically corresponding image data stored as photorealistic image data (104); and concluding that the vehicle is in an actual off-road position and that no update of the geographic database is required if no road (i.e. no road characteristics such as road pavement markings or other vehicles) is detected in the geographically coded image generated by the vehicle-mounted camera (108).

Another mode of the method according to the invention includes analyzing the geographically coded image generated by the vehicle-mounted camera in order to detect road characteristics in the geographically coded image (106), if the geographically coded image matches geographically corresponding image data stored as photorealistic image data (104); checking whether new road vector data are available on a remote server (110), if a road is detected in the geographically coded image generated by the vehicle-mounted camera; and downloading the new road vector data from the remote server, if new road vector data are available on the remote server (114).

Another mode of the method according to the invention includes analyzing the geographically coded image generated by the vehicle-mounted camera in order to detect road characteristics in the geographically coded image (106), if the geographically coded image matches geographically corresponding image data stored as photorealistic image data (104); checking whether new road vector data are available on a remote server (110), if a road is detected in the geographically coded image generated by the vehicle-mounted camera (106); and reporting a road vector update based on readings provided by the in-vehicle navigation system while driving along the road which has been detected (112), if no new road vector data are available on the remote server (110).

Another mode of the method according to the invention includes analyzing the geographically coded image generated by the vehicle-mounted camera by comparing the geographically coded image to stored photorealistic image data; and reporting a low reliability of the in-vehicle navigation system (118) if the geographically coded image generated by the vehicle-mounted camera does not match geographically corresponding stored photorealistic image data for a current position (104), but a last matched road or a nearest road is detected in the geographically coded image generated by the vehicle-mounted camera (116). In other words, if the geographically coded image taken by the vehicle-mounted camera does not match the stored image for a current GPS reading but matches a stored image of a road that is nearby, then the GPS reading is inaccurate. This allows reporting a low reliability or insufficient reliability of the in-vehicle navigation system related to weather or related to location-dependent factors.

Another mode of the method according to the invention includes analyzing the geographically coded image generated by the vehicle-mounted camera by comparing the geographically coded image to stored photorealistic image data; and concluding that the vehicle is in an actual off-road position and that no update of the geographic database is required (122), if the geographically coded image generated by the vehicle-mounted camera does not match geographically corresponding stored photorealistic image data for a current position (104) and neither a last matched road nor a nearest road nor road characteristics are detected in the geographically coded image generated by the vehicle-mounted camera (116, 120).

Another mode of the method according to the invention includes analyzing the geographically coded image generated by the vehicle-mounted camera by comparing the geographically coded image to stored photorealistic image data; and checking whether new data (such as road vector data, image data or other map-related data) are available for downloading (124) if road characteristics are detected in the geographically coded image generated by the vehicle-mounted camera (120) but the geographically coded image does not match geographically corresponding stored photorealistic image data for a current position (104) and if further neither a last matched road nor a nearest road is detected in the geographically coded image (116). If new data are available for downloading from a remote server, the new data are downloaded (126). If no new data are available for downloading, then the existence of a new road is reported based on the road characteristics detected in the geographically coded image (128); and geographically coded images of the new road are generated by using the vehicle-mounted camera (130). The step of generating geographically coded images of the new road preferably includes generating geographically coded images of an intersection between the new road and a known road. This is advantageous because it is likely that new road surface markings such as center lines, turn restriction signs, etc. have been painted on the new road and/or on the known road (i.e. the previously existing road) around the intersection. Furthermore, street names, traffic signs, and other valuable information are typically located at intersections and thus it is advantageous to generate geographically coded images of the intersection where the new road meets a known road.

Another mode of the method according to the invention includes checking whether the geographically coded image can be generated with a sufficient quality based on a weather condition and/or a light condition; and reporting a request for a further analysis of a given position, if the geographically coded image cannot be generated with a sufficient quality.

The step of reporting a request for a further analysis of a given position advantageously includes a request for imagery to be taken by another vehicle.

Another mode of the method according to the invention includes determining whether a new road is detected with a given confidence level; and adding the new road directly to a database of the in-vehicle navigation system if the new road is detected with the given confidence level. Another mode of the method according to the invention includes displaying, with the in-vehicle navigation system, the new road as an unconfirmed road until the new road is confirmed and updated in a main database.

Another mode of the method according to the invention includes sending a start location and a destination location from the in-vehicle navigation system to a remote server; performing, with the remote server, a route calculation for the vehicle by considering new roads added by other vehicles to a main database on the remote server; and sending a calculated route from the remote server to the vehicle. This allows calculating an optimum route considering all the anomalies reported for the related area.

Another mode of the method according to the invention includes using the vehicle-mounted camera and a further vehicle-mounted camera for generating geographically coded images such that the vehicle-mounted camera and the further vehicle-mounted camera capture images of a ground area forward and, respectively, rearward of the vehicle.

A further mode of the method according to the invention includes using the vehicle-mounted camera and at least one further vehicle-mounted camera for generating geographically coded images such that the vehicle-mounted camera captures images of a ground area forward or rearward of the vehicle and such that the at least one further vehicle-mounted camera captures images of at least a ground area sideways of the vehicle. It is therefore in principle possible to capture images of the ground area on all four sides of the vehicle by using a front camera, a rear camera and side cameras.

According to another mode of the method of the invention, the step of analyzing the geographically coded image includes searching the geographically coded image for at least one road characteristic such as a road outline, a curb, a road surface marking, a traffic sign and another vehicle.

According to another mode of the method of the invention, the step of determining whether the vehicle is in an on-road position includes comparing measured position data with stored road vector data.

According to another mode of the method of the invention, the geographically coded image includes an image of a ground area adjacent to the vehicle and at least one geographic coordinate. The geographically coded image preferably covers a substantially trapezoidal ground area adjacent to the vehicle and includes four geographic coordinates indicating four corner points of the substantially trapezoidal ground area.

According to another mode of the method of the invention, the in-vehicle navigation system is a satellite navigation system using a geographic database containing at least road vector data and photorealistic image data.

Other features which are considered as characteristic for the invention are set forth in the appended claims.

Although the invention is illustrated and described herein as embodied in a method for updating a geographic database, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now to the figures of the drawings, the method for updating a database in accordance with the invention is described in detail. The present invention proposes a method for updating geographic, satellite, and/or aerial imagery databases for use in maps in general, and for use with in-vehicle navigation systems in particular. When describing the preferred embodiments, it will be assumed that the imagery databases are located in a remote storage medium, which is also called a server and that the vehicle needs to download data from this server wirelessly as required to generate the pertinent maps. Nevertheless, the core concept can be equally applied to conventional in-vehicle navigation systems.

As mentioned above, geographic databases include a geographic representation of the roads in the form of a road map vector database. Geographic databases may furthermore include speed limits along the roads, turn restrictions and other information related to roads. Geographic databases can also include points of interest such as hotels, restaurants, and gas stations. As stated above, the information in these geographic databases must be continuously updated. As will be described in more detail below, the present invention improves the process of updating a geographic database by combining the process of sensing an anomaly with obtaining and reporting valuable on-site information in order to increase the confidence level of the anomaly report and, ultimately, to determine whether an imagery database is obsolete and needs to be updated or not. The present invention improves the process of updating a geographic database furthermore by acquiring geographically coded imagery and information about new roads in an efficient and cost-effective manner.

Figure 5:
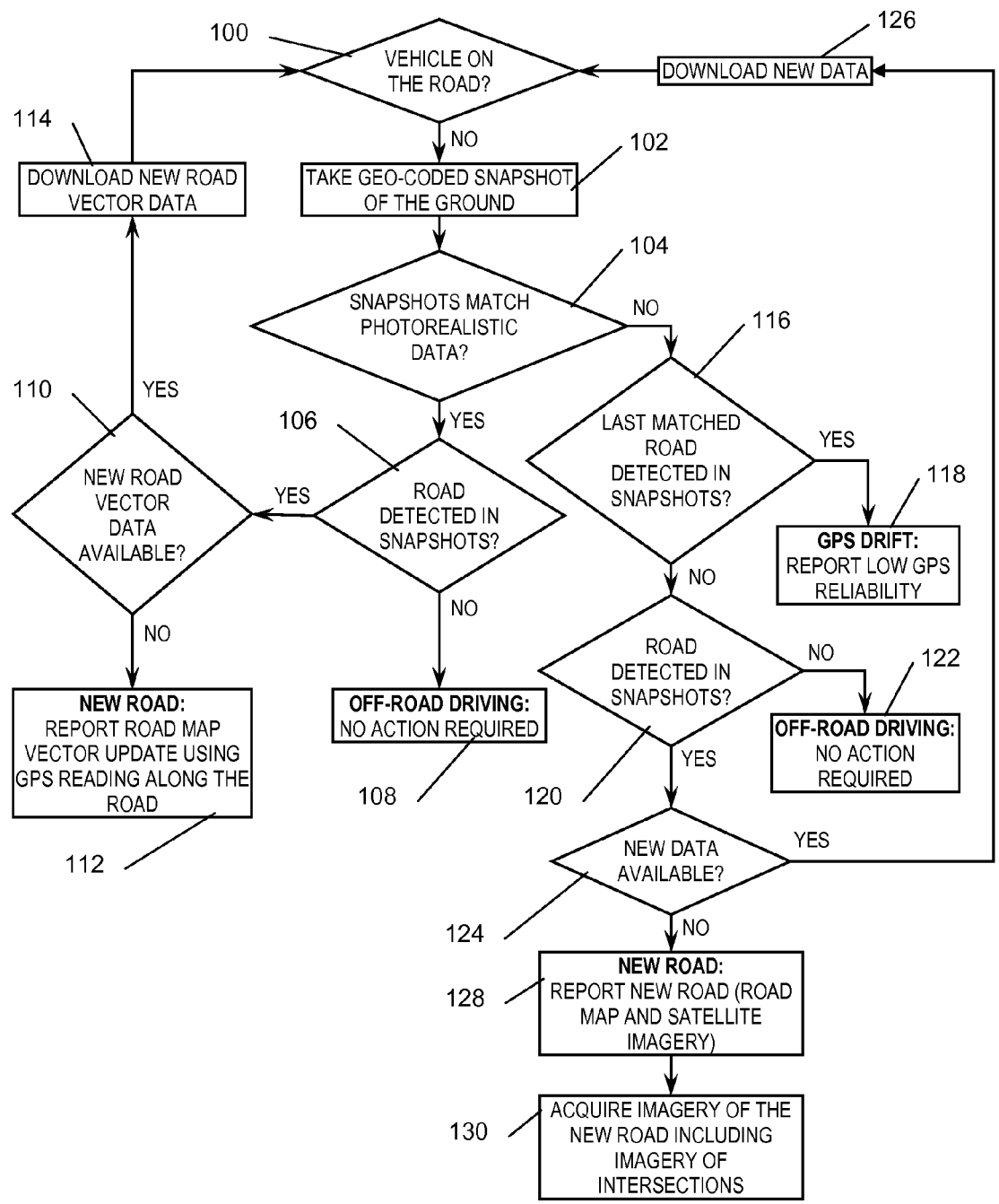
FIG. 5 is a flow chart illustrating steps of detecting, analyzing and reporting anomalies according to the invention.

FIG. 5 is a flow chart illustrating steps of the method according to the invention for detecting, analyzing and reporting anomalies such as new roads, low GPS accuracy, and deliberate off-road driving. In an initial step 100 it is determined if the vehicle is "virtually" driving on the road or if the vehicle is driving off-road by comparing the real-time GPS reading with the road map vector data available on board. If step 100 determines that the vehicle is driving off-road, that is, if the real-time geographic coordinates given by the in-vehicle navigation system differ substantially from the coordinates of the last matched road or the nearest road, then a geographically coded snapshot of the ground around the vehicle is taken in step 102. The geographically coded snapshot or image is preferably generated by using a front and/or rear camera of the vehicle. Alternatively or additionally, cameras may be mounted on the sides of the vehicle or in other suitable mounting locations. In step 104, the geographically coded images generated by the front and/or rear camera of the vehicle are then compared with photorealistic imagery of the same geographic location that is available in the vehicle for this purpose. If the geographically coded image taken with the vehicle-mounted camera matches the geographically corresponding photorealistic image data, it can be concluded that the in-vehicle navigation system GPS is not affected by a drift error. In this case, the method verifies which of the following options is true: First, the user may be deliberately driving off-road as is indicated in step 108. Second, the road map data that is available as an in-vehicle map database may be old, as indicated in steps 110 and 114. Third, there may be a new road to be reported, as indicted by step 112.

In step 106, the snapshots, i.e. the geographically coded images, are analyzed in order to determine if there is a road ahead by looking for road patterns. Road patterns may for example include lines, curves, other vehicles, road pavement markings, and traffic signs. In addition, on-board sensors configured to detect radar waves or ultrasound waves and other conventional methods can be used as an option or in combination with the snapshot analysis in order to detect if there is a road ahead. If no road is detected in step 106, then the user is driving off-road and no action should be taken as shown in step 108. If a road is detected in step 106, then either the road map vector data available in the vehicle for that specific area is out of date—in which case new data should be downloaded from the server as shown in step 114—or a new road has been detected and should be reported as shown in step 112. Note that in this case, since the photorealistic data matched well with the snapshots (step 104), only the road map vector database should be updated. The report for this new road should contain the GPS readings along the new road until the vehicle merges again into a known road, i.e. a road defined in the in-vehicle road map vector database. Also, in order to increase the confidence level of the report, the data and results obtained when performing the method steps including the analysis of the snapshots of the surroundings and the datasets of sensors used for the road detection process may be included in the report.

Figure 1:
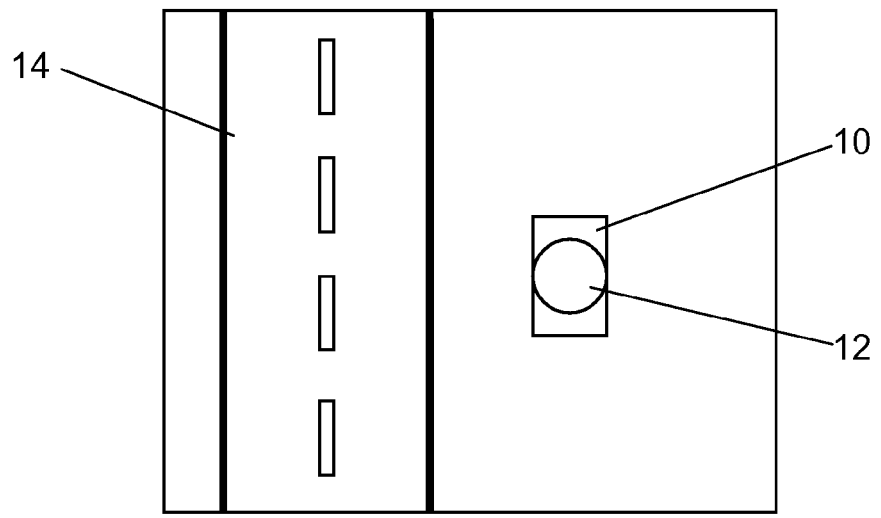
FIG. 1 is a schematic representation of a map view for illustrating a vehicle in an off-road position with an in-vehicle navigation system correctly indicating the off-road position in accordance with the invention.
Figure 2:
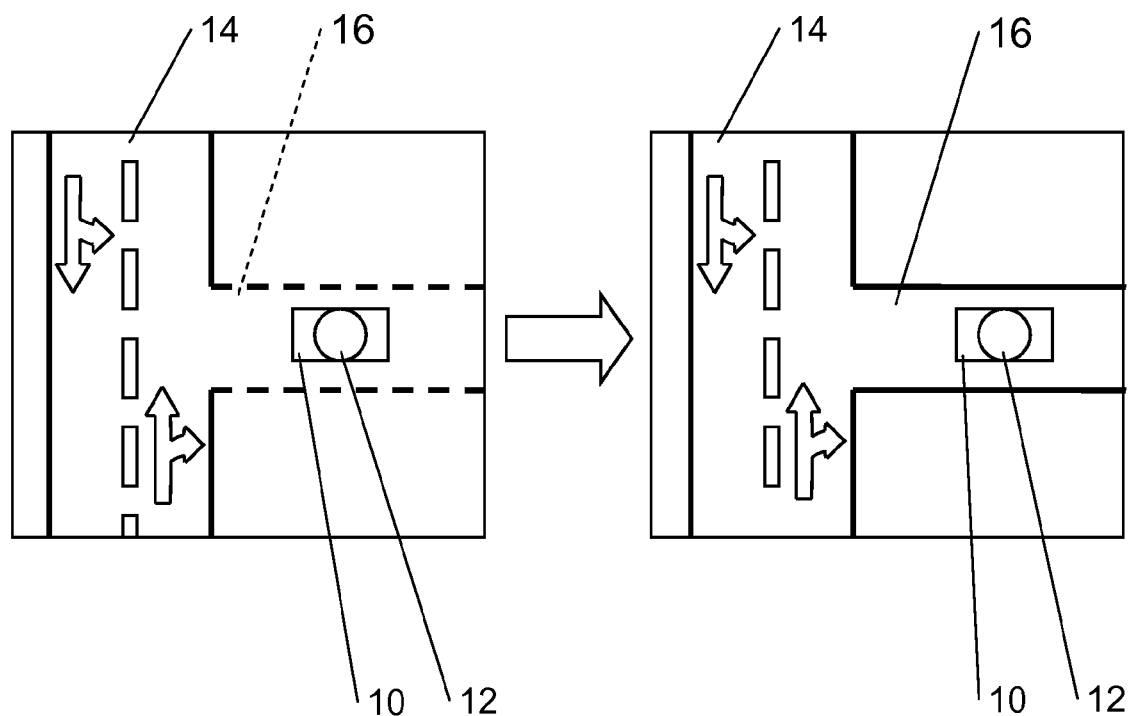
FIG. 2 is a schematic representation of map views for illustrating the process of updating a road map vector database wherein the left portion of FIG. 2 indicates a situation prior to the road map vector database being updated and wherein the right portion of FIG. 2 indicates the situation after the road map vector database has been updated in accordance with the invention.

The above-described two initial anomalies, namely an actual off-road driving and the existence of a new road, are further explained with respect to FIGS. 1 and 2. FIG. 1 is a map view for illustrating a vehicle in an off-road position with an in-vehicle navigation system correctly indicating the off-road position. FIG. 2 shows map views for illustrating the process of updating a road map vector database wherein the left portion of FIG. 2 indicates the situation prior to the road map vector database being updated and wherein the right portion of FIG. 2 indicates the situation after the road map vector database has been updated. More specifically, in FIGS. 1 and 2, the rectangle 10 represents the real position of the vehicle. The circle 12 represents the reading of the in-vehicle navigation system for the position of the vehicle. FIG. 1 schematically represents the case in which the user is for example deliberately driving off-road. This can be can be seen in FIG. 1 because the circle 12 indicating the reading of the in-vehicle navigation system matches well with the rectangle 10 indicating the location of the vehicle and because the actual vehicle position 12 is not on the road 14.

FIG. 2 shows the case in which the vehicle is driving on a new road 16 that is not defined in the road vector database of the in-vehicle navigation system. The new road 16 is indicated by dashed lines in the left portion of FIG. 2 in order to show that the new road is not defined in the road vector database of the in-vehicle navigation system. After either reporting the new road 16 or downloading updated road vector data, the new road 16 is added to the road map vector database of the in-vehicle database. After the new road 16 is defined in the road vector database of the in-vehicle database, the new road 16 is represented by solid lines as indicated in the right portion of FIG. 2. The graphical representation of a new road that is not yet defined in the road vector database of the in-vehicle database is preferably shown on the display screen of the in-vehicle navigation system in a color that is different from the color of roads that are defined in the road vector database of the in-vehicle database.

Turning again to the flow chart shown in FIG. 5, the following situations are also possible. If step 100 determined that the vehicle is "virtually" not on a road, which is determined by comparing the GPS reading of the in-vehicle navigation system and the road map vector database available in the vehicle, a geographically coded image, i.e. a camera snapshot, of the surroundings is taken in step 102 by using the front and/or rear cameras of the vehicle. Alternatively or additionally, cameras may be mounted in other suitable mounting locations, for example on the sides of the vehicle. If the geographically coded images generated with the cameras in step 102 do not match the photorealistic image data available for the same location as indicated by step 104, the following options are possible: First, the in-vehicle navigation system is affected by a drift error, i.e. the GPS provides inaccurate data and therefore the system compares imagery of two different locations. Second, the user is driving off-road and the geographically coded image taken by the camera shows for example the unpaved side or shoulder of the road that has simply changed because there may be green grass in the spring, dirt in the summer or snow in the winter. Third, the data in the vehicle are old and need to be updated. The update applies to both, the photorealistic image data and the road vector data. Fourth, a new road has been detected and should be reported. In this case, data for both, the photorealistic images and the road vectors should be acquired.

In order to determine if the in-vehicle navigation system is affected by a drift error, after it has been corroborated in step 104 that the geographically coded snapshot images of the surroundings of the vehicle do not match the stored photorealistic imagery for the location given by the in-vehicle navigation system, it should be determined whether the vehicle is still on the last matched road or on a previously matched road, as shown in step 116. In order to determine whether the vehicle is still on the last matched road or on a previously matched road, dead reckoning methods, which may use sensor information such as speed, driving wheel angle and compass data, should be contrasted with the GPS data provided by the in-vehicle navigation system. Also, the image snapshots may be compared with the stored photorealistic imagery for the calculated location along previous road sections assuming the vehicle is still on this road and using speed data of the vehicle. If step 116 determines that the car is still on one of the previous road sections, a low GPS reliability should be reported at that location as shown in step 118. The report may include the location of the anomaly and also datasets used in the computation in order to increase the confidence level.

If it is determined in step 116 that the vehicle is not on the previous road by contrasting GPS data with dead reckoning methods, it may be that the user is deliberately driving off-road. This is the case if in step 120 no roads are detected in the image snapshots generated by the vehicle-mounted cameras and/or no roads are detected by using complementary road detection methods. No action should be taken if the user is driving off-road as indicated in step 122.

Finally, if a road is detected in step 120, the system should first check in step 124 whether there is a newer version of data for both, road map vectors and photorealistic imagery for that location available on the server. If there is an update available, the vehicle should download the new data in step 126. If step 124 determines that no new data are available for downloading, the system should report a new road as is indicated in step 128. This report should include GPS readings along the new road until the vehicle merges into a known road, i.e. a road defined in the in-vehicle road map vector database. The report should further include geographically coded snapshot images of the road at given calculated distances so that the whole new road is covered. The distance between image snapshots depends mainly on the specifications of the camera and how the camera is mounted in the vehicle. In other words, it depends on the area of the road that is obtainable by the camera in one image snapshot. The report on the new road should further include evidence to show why the anomaly fits in the "new road" category. The evidence would generally include datasets used for performing the method steps. Further, a request for imagery at all intersections between known roads and the new road should be reported because it is likely that new road surface markings such as turn restriction signs and other signs have been painted on the road. Furthermore, street names, traffic signs, and other valuable information that are typically located at intersections should be photographed. The step of acquiring image data is indicated by step 130 in FIG. 5.

Figure 3:
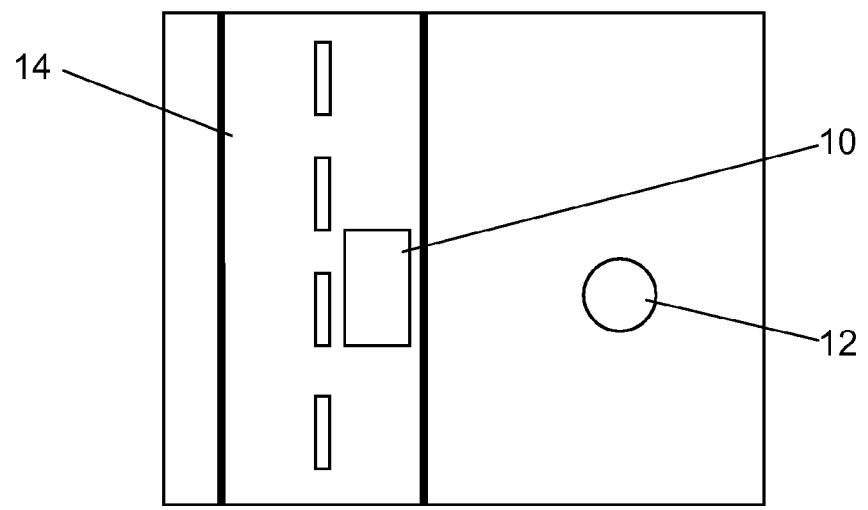
FIG. 3 is a schematic representation of a map view for illustrating a vehicle positioned on a road, wherein the in-vehicle navigation system indicates an off-road position for the vehicle due to a drift error affecting the readings of the in-vehicle navigation system.

FIG. 3 is a schematic representation of a map view for illustrating a vehicle positioned on a road, wherein the in-vehicle navigation system incorrectly indicates an off-road position for the vehicle due to a drift error affecting the readings of the in-vehicle navigation system. The real position of the vehicle on the road 14 is represented by a rectangle 10. A circle 12 represents the reading of the in-vehicle navigation system for the position of the vehicle, wherein the reading is in this case inaccurate due to a drift error. The situation shown in FIG. 3 corresponds to the situation of step 118 in FIG. 5.

Figure 4:
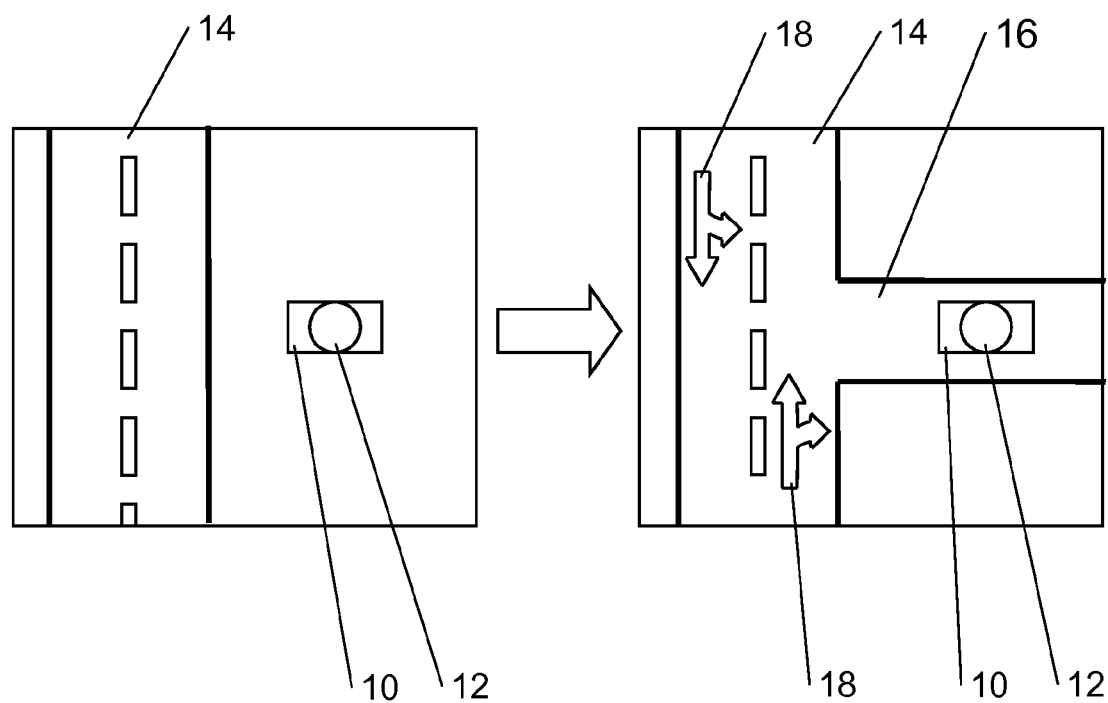
FIG. 4 is a schematic representation of map views for illustrating the process of updating a photorealistic image database wherein the left portion of FIG. 4 indicates a situation prior to the photorealistic image database being updated and wherein the right portion of FIG. 4 indicates the situation after the photorealistic image database has been updated in accordance with the invention.

FIG. 4 shows a schematic representation of map views for illustrating the process of updating a photorealistic image database wherein the left portion of FIG. 4 indicates a situation prior to the photorealistic image database being updated and wherein the right portion of FIG. 4 indicates the situation after the photorealistic image database has been updated. In FIG. 4, the rectangle 10 representing the real position of the vehicle coincides with the circle 12 representing the accurate GPS reading. The left portion of FIG. 4 illustrates that the newly detected road is not yet available in the road map vector database or the photorealistic image database. The map view in the right portion of FIG. 4 shows the new road 16 after the road map vector database and the photorealistic image database has been updated. In this case, the update includes an intersection update so that for example the road surface markings 18 at the intersection between the known road 14 and the new road 16 have been added as update information to the database.

Figure 6:
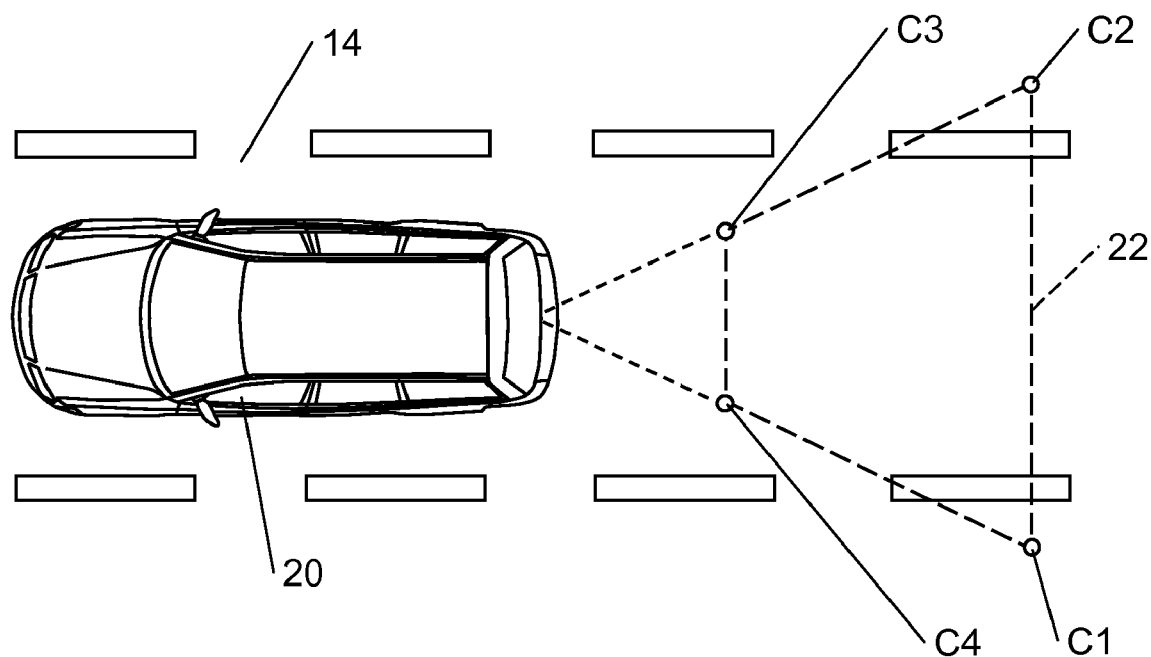
FIG. 6 is a diagrammatic top plan view of a vehicle generating a geographically coded image in accordance with the invention.

FIG. 6 shows a top view of a vehicle 20 generating a geographically coded image with a vehicle mounted camera looking rearward. FIG. 6 shows how a snapshot image can be geographically described. Since the shape of the resulting snapshot image represents a trapezoid 22 on the road 14, four coordinates C1, C2, C3, and C4 are required to describe the image snapshot.

Figure 7:
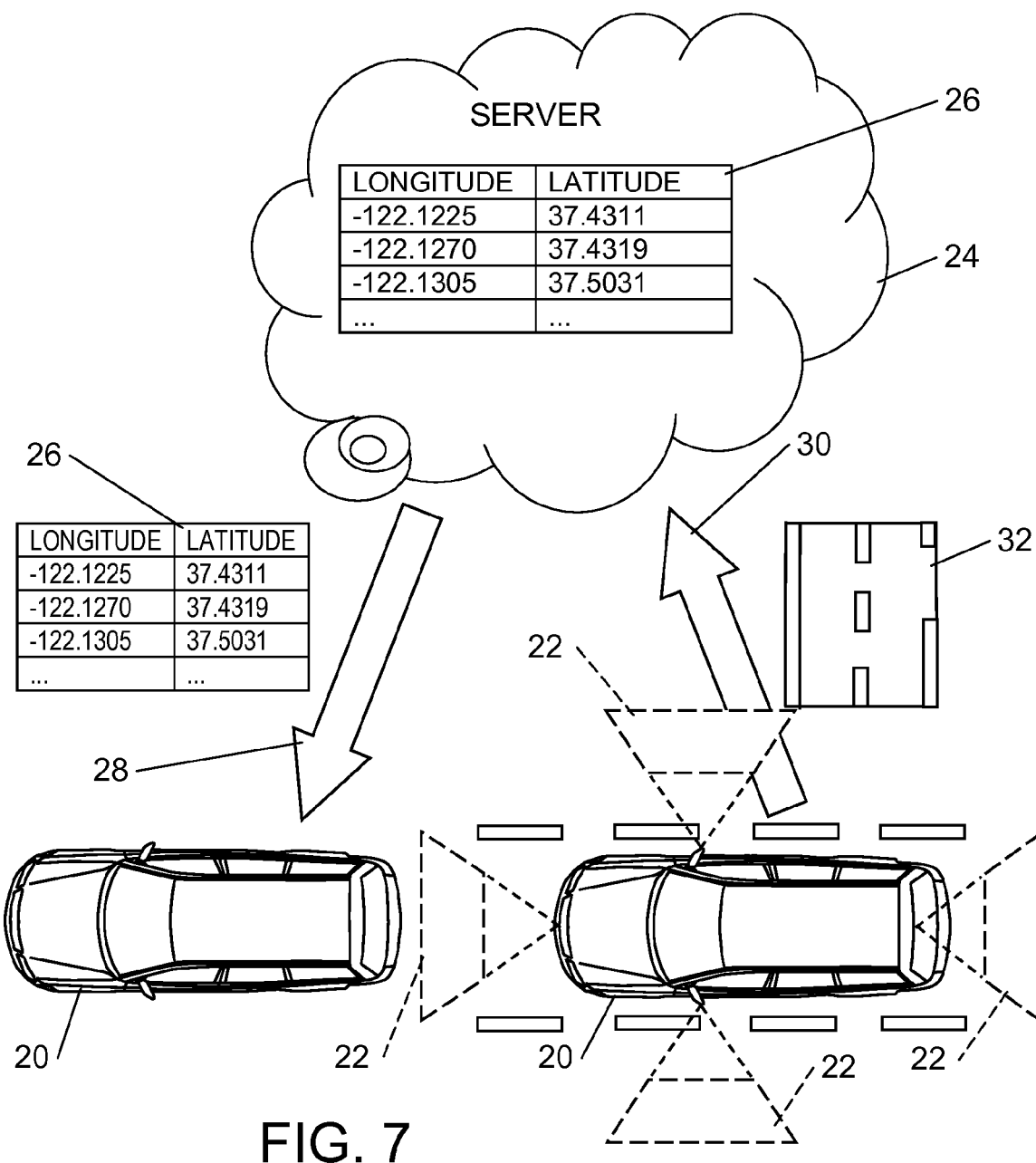
FIG. 7 is a schematic diagram for illustrating a communication between a vehicle and a server in accordance with the invention.

FIG. 7 is schematic diagram for illustrating a communication between a vehicle 20 and a server 24. FIG. 7 schematically shows how the vehicle 20 may communicate with the server 24 to obtain an up-to-date list of anomaly locations 26 for a particular region. The arrow 28 extending from the server 24 to the vehicle 20 indicates in this case a download of a list of anomaly locations 26. When the vehicle 20 drives over any of these locations and the light conditions and weather conditions are such that snapshot images can be generated with a quality that is sufficient for the required imagery analysis, the vehicle 20 should acquire on-site imagery as requested in the pertinent report and send it to the server 24. The arrow 30 extending from vehicle 20 to the server 24 indicates an upload of geographically coded image data 32 from the vehicle to the server 24.

The method for updating a database according to the invention is particularly suited for weather conditions and light conditions that result in snapshot images of sufficient quality because the method relies on imagery analysis. If bad weather or low light result in images of insufficient quality for a particular location, the vehicle should have the capability of reporting the anomaly together with a request for further analysis or a request for imagery. When another vehicle drives past this location and the conditions for generating geographically coded images have improved, the vehicle should take geographically-coded snapshots of the area and report them back as an addition of the existing report.

When a new road is detected with a high confidence level, it may be directly added in the in-vehicle navigation system of the user that reported such a new road. New roads may have a distinctive color in the map until they are confirmed and updated in the main database. After being confirmed, the status and distinctive color of the new road is then changed to a color representing the particular type of road.

In accordance with an embodiment of the invention, the routing calculation can be performed remotely on the server. A remote routing calculation would be more efficient, accurate and reliable than performing the route calculation on board since all new roads can be considered for the routing calculation. In order to perform the remote routing calculation, the start location and desired destination are sent to the server. The server then calculates the optimum path considering all the anomalies reported for the related map area. After the route has been calculated, the calculation result is sent back to the vehicle.

In view of the above-described method for updating a database it becomes clear that the method has the following main advantages over conventional methods. First of all, an update of a road map vector database as well as an update of satellite and/or aerial imagery database is made more efficient. In particular, an update of in-vehicle data is made more efficient. Further, the accuracy of an in-vehicle navigation system can be measured and thus the accuracy of in-vehicle navigation systems can be predicted with respect to a location, weather conditions or other conditions affecting the accuracy of GPS readings. Finally, the method of the invention ensures that the map data are constantly updated and the data are therefore as up to date as possible.

A characteristic feature of an embodiment of the invention is that a new road anomaly report is provided. The new road anomaly report typically contains GPS readings along the new road, geographically coded snapshots images of a vehicle's surroundings along the new road using vehicle-mounted cameras, date and time information, local weather conditions and/or light conditions, and a dataset of road-detection assistive systems such as radar sensors and ultrasound sensors.

A further characteristic feature of an embodiment of the invention is that a low GPS accuracy anomaly report is provided. The low GPS accuracy anomaly report typically contains GPS readings, geographically coded snapshot images of the vehicle's surroundings, in particular snapshot images of the road taken with vehicle-mounted cameras, date and time information, local weather and/or light conditions, and a dataset of road-detection assistive systems.

Another characteristic feature of an embodiment of the invention is that a new road detection is performed by using photorealistic imagery and/or road map vector data available in the vehicle, image snapshots of the vehicle's surroundings, in particular image snapshots of roads, in-vehicle GPS readings, and information provided by road-detection assistive systems. A further characteristic feature of an embodiment of the invention is that photorealistic imagery of a new road that is generated using vehicle mounted front and/or rear cameras is uploaded from the vehicle to a server.

Another feature is that a new imagery data request can be made based on photorealistic imagery and/or road map data available in the vehicle, snapshot images of the vehicle's surroundings, GPS readings of the in-vehicle navigation system, and information provided by road-detection assistive systems. In accordance with a further feature, new imagery data can be download from a server to the vehicle based on photorealistic imagery and/or road map data available in the vehicle, snapshot images of the vehicle's surroundings, GPS readings of the in-vehicle navigation system, and information provided by road-detection assistive systems. A further characteristic feature of an embodiment of the invention is that new roads can be temporarily or provisionally added to the database of the navigation system of the vehicle that detects such new roads depending on a confidence level of the new road report. In accordance with another feature, the temporary or provisional status of a new road is changed to a definitive status when the new road is confirmed and stored in the main database on the server. If the new road is not confirmed and/or is deleted in the main database on the server, the temporary road is deleted.

What is claimed is:

1. A method for updating a database, which comprises the steps of:
    determining whether a vehicle is in an on-road position based on information provided by an in-vehicle navigation system;
    generating a geographically coded image by using a vehicle-mounted camera, if the vehicle is not in an on-road position according to the information provided by the in-vehicle navigation system; and
    analyzing the geographically coded image generated by the vehicle-mounted camera in order to determine whether a geographic database requires updating.

2. The method according to claim 1, wherein the step of analyzing the geographically coded image generated by the vehicle-mounted camera includes comparing the geographically coded image to stored photorealistic image data.

3. The method according to claim 1, which comprises:
    analyzing the geographically coded image generated by the vehicle-mounted camera in order to detect road characteristics in the geographically coded image, if the geographically coded image matches geographically corresponding image data stored as photorealistic image data; and
    concluding that the vehicle is in an actual off-road position and that no update of the geographic database is required if no road is detected in the geographically coded image generated by the vehicle-mounted camera.

4. The method according to claim 1, which comprises:
    analyzing the geographically coded image generated by the vehicle-mounted camera in order to detect road characteristics in the geographically coded image, if the geographically coded image matches geographically corresponding image data stored as photorealistic image data;
    checking whether new road vector data are available on a remote server, if a road is detected in the geographically coded image generated by the vehicle-mounted camera; and
    downloading the new road vector data from the remote server, if new road vector data are available on the remote server.

5. The method according to claim 1, which comprises:
    analyzing the geographically coded image generated by the vehicle-mounted camera in order to detect road characteristics in the geographically coded image, if the geographically coded image matches geographically corresponding image data stored as photorealistic image data;
    checking whether new road vector data are available on a remote server, if a road is detected in the geographically coded image generated by the vehicle-mounted camera; and
    reporting a road vector update based on readings provided by the in-vehicle navigation system while driving along the road which has been detected, if no new road vector data are available on the remote server.

6. The method according to claim 1, which comprises:
    analyzing the geographically coded image generated by the vehicle-mounted camera by comparing the geographically coded image to stored photorealistic image data; and
    reporting a low reliability of the in-vehicle navigation system, if the geographically coded image generated by the vehicle-mounted camera does not match geographically corresponding stored photorealistic image data for a current position, but one of a last matched road and a nearest road is detected in the geographically coded image generated by the vehicle-mounted camera.

7. The method according to claim 1, which comprises:
    analyzing the geographically coded image generated by the vehicle-mounted camera by comparing the geographically coded image to stored photorealistic image data; and
    concluding that the vehicle is in an actual off-road position and that no update of the geographic database is required, if the geographically coded image generated by the vehicle-mounted camera does not match geographically corresponding stored photorealistic image data for a current position and neither a last matched road nor a nearest road nor road characteristics are detected in the geographically coded image generated by the vehicle-mounted camera.

8. The method according to claim 1, which comprises:
analyzing the geographically coded image generated by the vehicle-mounted camera by comparing the geographically coded image to stored photorealistic image data; and
checking whether new data are available for downloading, if road characteristics are detected in the geographically coded image generated by the vehicle-mounted camera but the geographically coded image does not match geographically corresponding stored photorealistic image data for a current position and if further neither a last matched road nor a nearest road is detected in the geographically coded image.

9. The method according to claim 8, which comprises downloading new data if new data are available for downloading from a remote server.

10. The method according to claim 8, which comprises:
reporting an existence of a new road based the road characteristics detected in the geographically coded image if no new data are available for downloading; and
generating geographically coded images of the new road by using the vehicle-mounted camera.

11. The method according to claim 10, wherein the step of generating geographically coded images of the new road includes generating geographically coded images of an intersection between the new road and a known road.

12. The method according to claim 1, which comprises:
checking whether the geographically coded image can be generated with a sufficient quality based on at least one condition selected from the group consisting of a weather condition and a light condition; and
reporting a request for a further analysis of a given position, if the geographically coded image cannot be generated with a sufficient quality.

13. The method according to claim 12, wherein the step of reporting a request for a further analysis of a given position includes a request for imagery to be taken by another vehicle.

14. The method according to claim 1, which comprises:
determining whether a new road is detected with a given confidence level; and
adding the new road directly to a database of the in-vehicle navigation system if the new road is detected with the given confidence level.

15. The method according to claim 14, which comprises displaying, with the in-vehicle navigation system, the new road as an unconfirmed road until the new road is confirmed and updated in a main database.

16. The method according to claim 1, which comprises:
sending a start location and a destination location from the in-vehicle navigation system to a remote server;
performing, with the remote server, a route calculation for the vehicle by considering new roads added by other vehicles to a main database on the remote server; and
sending a calculated route from the remote server to the vehicle.

17. The method according to claim 1, which comprises using the vehicle-mounted camera and a further vehicle-mounted camera for generating geographically coded images such that the vehicle-mounted camera and the further vehicle-mounted camera capture images of a ground area forward and, respectively, rearward of the vehicle.

18. The method according to claim 1, which comprises using the vehicle-mounted camera and at least one further vehicle-mounted camera for generating geographically coded images such that the vehicle-mounted camera captures images of a ground area forward or rearward of the vehicle and such that the at least one further vehicle-mounted camera captures images of at least a ground area sideways of the vehicle.

19. The method according to claim 1, wherein the step of analyzing the geographically coded image includes searching the geographically coded image for at least one road characteristic selected from the group consisting of a road outline, a curb, a road surface marking, a traffic sign and another vehicle.

20. The method according to claim 1, wherein the step of determining whether the vehicle is in an on-road position includes comparing measured position data with stored road vector data.

21. The method according to claim 1, wherein the geographically coded image includes an image of a ground area adjacent to the vehicle and at least one geographic coordinate.

22. The method according to claim 21, wherein the geographically coded image covers a substantially trapezoidal ground area adjacent to the vehicle and includes four geographic coordinates indicating four corner points of the substantially trapezoidal ground area.

23. The method according to claim 1, wherein the in-vehicle navigation system is a satellite navigation system using a geographic database containing at least road vector data and photorealistic image data.

* * * * *